(12) United States Patent
Antonov et al.

(10) Patent No.: US 7,229,379 B2
(45) Date of Patent: Jun. 12, 2007

(54) TRANSMISSION DEVICE FOR LAND VEHICLE, SUCH AS A CART

(75) Inventors: Roumen Antonov, Paris (FR); Guillaume Dazin, Nesles la Vallee (FR)

(73) Assignee: Antonov Automotive Technologies, Rotterdam (NL)

( * ) Notice: Subject to any disclaimer, the term of this patent is extended or adjusted under 35 U.S.C. 154(b) by 52 days.

(21) Appl. No.: 10/515,322

(22) PCT Filed: May 13, 2003

(86) PCT No.: PCT/FR03/01448

§ 371 (c)(1),
(2), (4) Date: Nov. 23, 2004

(87) PCT Pub. No.: WO03/100292

PCT Pub. Date: Dec. 4, 2003

(65) Prior Publication Data

US 2005/0202926 A1    Sep. 15, 2005

(30) Foreign Application Priority Data

May 23, 2002    (FR) .................................. 02 06319

(51) Int. Cl.
*F16H 3/74*    (2006.01)

(52) U.S. Cl. ...................................... 475/258; 475/267

(58) Field of Classification Search ................ 475/293, 475/259, 262, 267, 270, 298, 299, 300, 258, 475/282, 311, 312, 317, 318; 192/105 C
See application file for complete search history.

(56) References Cited

U.S. PATENT DOCUMENTS

| | | | | |
|---|---|---|---|---|
| 4,229,996 A | * | 10/1980 | Hildebrand | .................. 475/55 |
| 4,722,242 A | * | 2/1988 | Miura et al. | ................. 475/205 |
| 5,733,217 A | * | 3/1998 | Naraki et al. | ............... 475/258 |
| 5,993,347 A | * | 11/1999 | Park | ........................... 475/280 |
| 5,997,429 A | * | 12/1999 | Raghavan et al. | .......... 475/280 |
| 6,066,065 A | * | 5/2000 | Breen | ......................... 475/312 |

* cited by examiner

*Primary Examiner*—Charles A. Marmor
*Assistant Examiner*—Justin K. Holmes
(74) *Attorney, Agent, or Firm*—Kenyon & Kenyon LLP

(57) ABSTRACT

For a first gear ratio, the flyweights engage the clutch and thus connect the input to the sun wheel, whilst the ring gear is immobilised by the free wheel. For the second gear ratio, the flyweights push the ring gear against the axial thrust of the helical teeth in a direction causing the engagement of the clutch against the ring and thus, at the same time, the disengagement of the clutch. The thrust produced by the teeth on the ring gear decreases and transmission then occurs from the input to the ring gear, whilst the sun wheel is immobilised by its free wheel. The speed increases further, the flyweights rise further, compress the prestressed springs and push the ring in the direction of the engagement of the clutch, which produces direct drive.

25 Claims, 2 Drawing Sheets

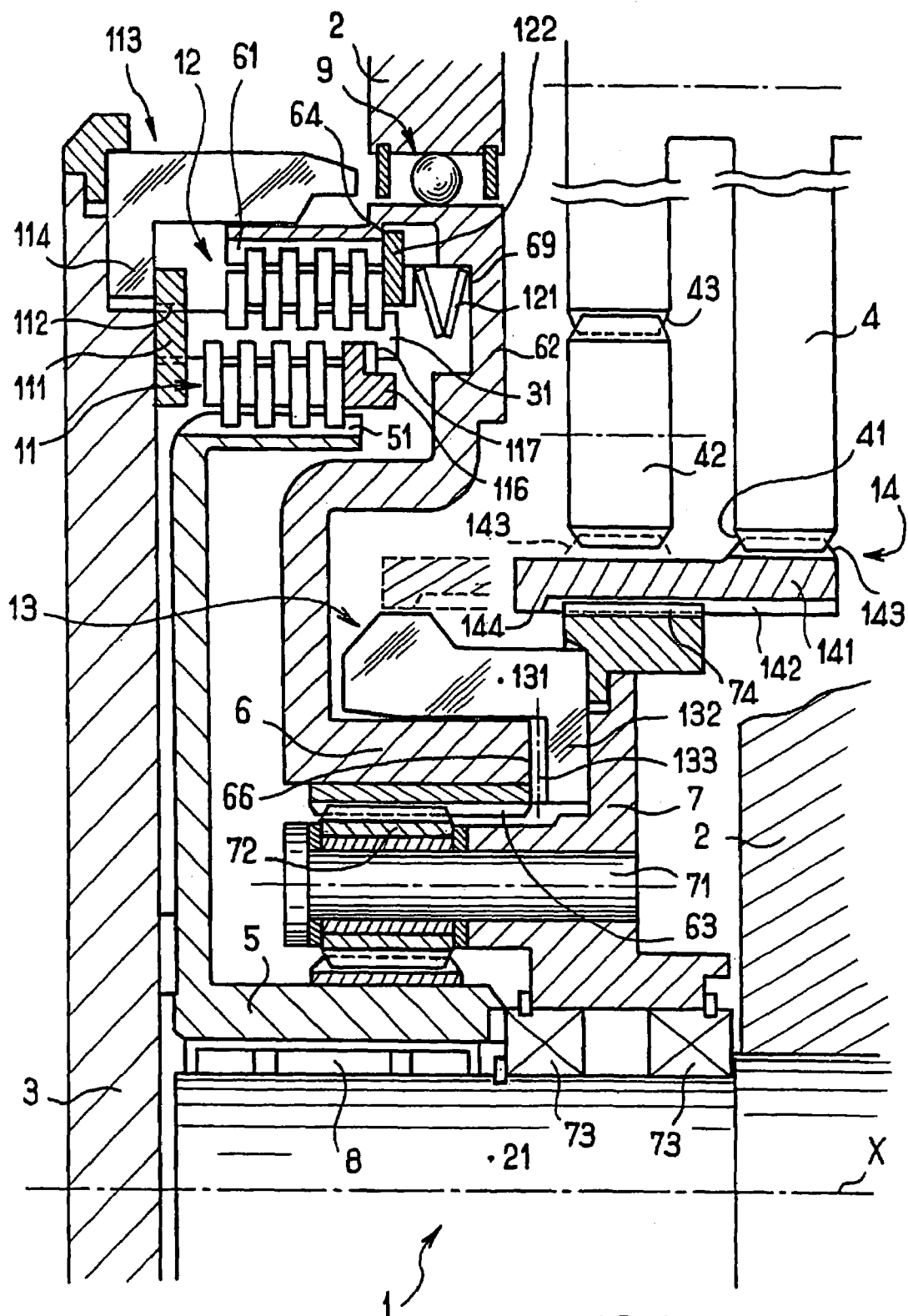
FIG_1

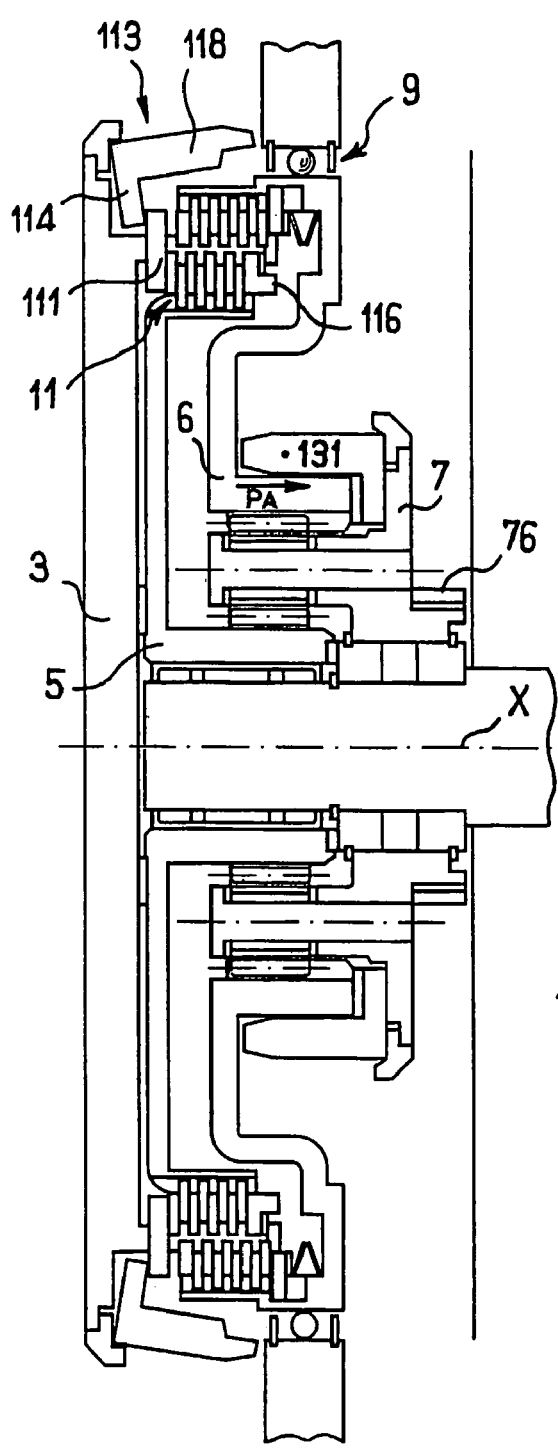
FIG_2
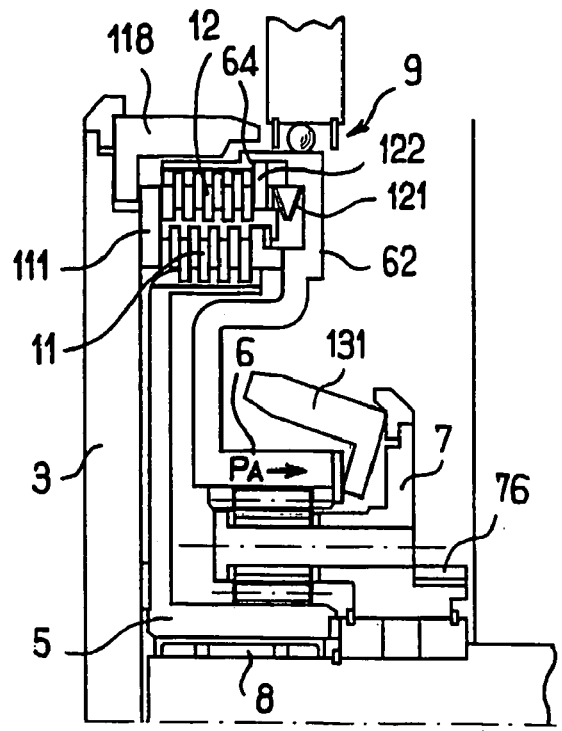
FIG_3
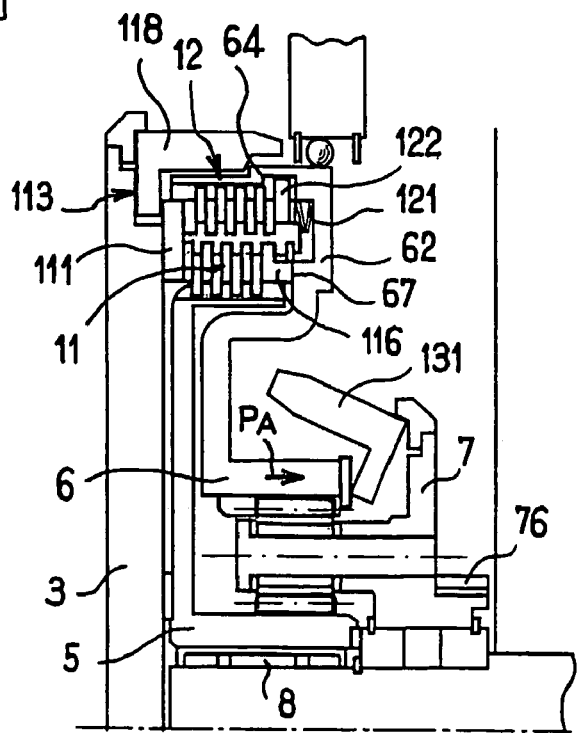
FIG_4

TRANSMISSION DEVICE FOR LAND VEHICLE, SUCH AS A CART

This invention relates to a transmission device for land vehicles, and in particular for small automotive vehicles, such as "unlicensed" lower-category cars. Light vehicles with engines with reduced capacity and/or power and/or with a limited maximum speed, which, depending on national legislation, can in certain countries be driven by people who do not have a driving license, are known as lower-category cars.

The invention relates more particularly to a transmission device having a particularly simple structure relative to the number of gear ratios available.

Almost all An automatic transmission devices use differential mechanisms and in particular planetary gear trains in which selective coupling means such as brakes, clutches and/or free wheels are used to change the gear ratio supplied by each set of planetary gears. Conventionally, a planetary gear train provides one of two gears, one of which is a direct drive gear obtained using a clutch that couples together two intermeshed rotational elements on the gear train. There are planetary gear trains that supply more than two gears, but in this case these are generally "complex" planetary gear trains, i.e. with more than three intermeshed rotational elements, which are in fact equivalent to at least two sets of planetary gears. Consequently, to produce a three-gear transmission device, two sets of planetary gears are currently required.

Furthermore, An automatic control is particularly complex and costly to achieve.

EP-A-0 683 877 relates to an automatic transmission device on which the An automatic control is simplified through the use of the axial thrust of the helical teeth, both to measure the torque transmitted and as an actuating force in proportion to this torque. This force holds open a direct-drive clutch between the input and the output of the planetary gear train when the planetary gear train is operating as a reduction unit. During this time, the third element of the gear train is immobilised by a free wheel. The direct-drive clutch is closed under the action of centrifugal flyweights when the speed of rotation is sufficient to enable them to overcome the axial thrust of the teeth.

With this known device, control is certainly simplified and consumes less energy, but again a simple planetary gear train only provides two gears.

Although a planetary gear train can in theory provide a number of gear ratios, it has not been possible in practice to obtain more than two, given the complexity involved in changing between two gears.

The object of the present invention is to propose a transmission device in which the means required to change from one gear to the other in a differential mechanism are considerably simplified.

Another object of the present invention is to propose a transmission device in which a simple differential mechanism, i.e. with only three intermeshed elements, is able to provide more than two gear ratios.

A further object of the present invention is to propose a transmission device that makes a number of gears available with a particularly simple structure and improved mechanical efficiency.

An additional object is to propose a particularly light transmission device that is economical to produce.

According to the invention, to meet all or some of these objects, the An automatic transmission device, particularly for land vehicles, comprises:

a rotational input element and a rotational output element;

a first and second toothed element, which each mesh with a third toothed element;

first and second coupling means to selectively couple a first one of the rotational input and output elements with the first and second toothed elements respectively;

a third coupling means to selectively couple the second of the rotational input and output elements with the third toothed element;

first and second stopping means to selectively immobilise the first and second toothed elements respectively;

a first actuator for the first coupling means; and a second actuator capable of a first position in which the first coupling means is capable of an engaged state and a disengaged state, and the second coupling means is disengaged, and a second position in which the first coupling means is disengaged and the second coupling means is in an engaged state.

The transmission device according to the invention allows for three gears to be obtained easily with a single planetary gear train. For this, the first rotational element, which is typically the rotational input element (for example an input shaft), is coupled by the first coupling means with the first toothed element, or by the second coupling means with the second element, or simultaneously by the first and second coupling means with the first and second toothed elements, in such a way as to achieve direct drive.

A fourth state, in which the first and second coupling means are disengaged, may correspond to neutral.

In its first position, the second actuator provided for according to the invention allows for the selection of either neutral or the first gear ratio, by means of the first actuator, and its second position corresponds to the second gear ratio, in which the first coupling means is disengaged and the second coupling means is in an engaged state.

Preferably, in the second position, to ensure that the first coupling means is disengaged, the second actuator exerts thrust on the first actuator through the intermediary of the first coupling means. Thus, the force applied to the second actuator is used both to place the second coupling means in an engaged state and to act on the first actuator in the direction of disengagement of the first coupling means.

In a preferred embodiment of the invention, the second actuator is capable of a third position, in which the first and second coupling means are in an engaged state.

This function is preferably achieved by moving the second actuator beyond its second position so that it acts on a third actuator that pushes the first coupling means against the first actuator, which meets a stop and then acts as a counterbearing.

At the same time, it is preferable that the first actuator be associated with a first control means suitable for the gradual setting in motion of the vehicle. This eliminates an input clutch between the engine and the transmission device. This represents a significant saving in terms of weight, cost and size. This first control means is preferably centrifugal. It may act on the first coupling means against a return spring, but this is not vital. On the contrary, a certain "drag" in the first coupling means may be preferred when the engine is at its idling speed, which allows the vehicle to be moved forward at very low speeds when the engine is idling. The driver can prevent this very slow movement by activating the brake pedal.

The first and second stopping means are preferably free wheels (also known as "one-way clutches"), which have the advantage that they do not require any specific control.

Finally, reversing means may be provided that, when they are activated, directly or indirectly hold the second actuator in its first position. This prevents the transmission device from establishing high gear ratios during operation in reverse.

Other features and advantages of the invention will furthermore emerge from the following description, relating to a non-limitative example.

In the appended drawings:

FIG. 1 is an axial cross-section half-view of an An automatic transmission device according to the invention, in neutral;

FIG. 2 is an axial cross-section of a device according to FIG. 1 (except that the reversing means are no longer shown), operating in first gear; and FIGS. 3 and 4 are half-views analogous to the upper part of FIG. 2, but when the device is operating in second and third gears respectively.

In the example shown in FIG. 1, the transmission device is mainly constituted by a differential mechanism 1 comprising:

- a housing element 2, which is only partly shown and comprises in particular a stator shaft 21, non-translatable and non-rotatable, extending along the general X-axis of the mechanism;
- a rotational input element 3, non-translatable relative to the housing element 2, and comprising in the example shown a disc centred on the general X-axis beyond one end of the stator shaft 21, the said disc being intended to be connected directly or indirectly, in a way not shown, to the shaft of a vehicle driving engine;
- a rotational output element 4, intended to be connected at least indirectly to the vehicle's wheels;
- a rotational sun element 5, arranged along the X-axis around the stator shaft 21 and able to rotate relative to it around the X-axis;
- a rotational element forming a ring gear 6, fitted around the X-axis and arranged around the sun element 5 and the stator shaft 21;
- a rotational element forming a planet carrier 7, carrying, evenly distributed around the X-axis, journals 71 that are eccentric relative to the general X-axis, on which planet pinions 72 rotate freely and mesh both with the sun element 5 and the ring gear 6, in such a way as to form a planetary gear train with them;
- a first free wheel 8, which prevents the sun element 5 from rotating in the opposite direction to the input element 3 relative to the housing element 2;
- a second free wheel 9, which prevents the ring gear 6 from rotating in the opposite direction to the input element 3 relative to the housing element 2;
- a first friction coupling means 11, selectively coupling the input element 3 with the sun element 5 in rotation around the X-axis;
- a second friction coupling means 12, selectively coupling the input element 3 and the ring gear 6 in rotation around the X-axis;

The friction coupling means 11 and 12 are wet multidisc clutches. To form them, the input element 3 has a series of ribs 31 that form a crown around the X-axis, being positioned axially. The crown of ribs 31 surrounds outer splines 51 that are attached to the sun wheel 5, and is surrounded by inner splines 61 that are attached to the ring gear 6. The first friction coupling means 11 comprises a stack of discs that are alternately coupled in rotation with the ribs 31 and the splines 51. The second friction coupling means 12 comprises a stack of discs that are alternately coupled in rotation with the ribs 31 and the splines 61.

The transmission device also has a first actuator 111 formed by a ring centred around the X-axis, which has openings 112 through which the ribs 31 extend. The first actuator 111 is fitted axially and slides on the ribs 31.

A first control means 113 is also provided for in the form of a series of centrifugal flyweights 118 distributed around of the X-axis and driven in rotation around the X-axis by the rotational input element 3. Under the effect of the centrifugal force developed by the rotation of the input element 3 around the X-axis, the flyweights can pivot from the idle position shown to a raised position that can be seen in FIG. 2. When the flyweights 118 are in idle position, the first actuator 111 can itself be in idle position resting against the radial surface of the element 3, from which the ribs 31 start. On the other hand, when the flyweights 118 are in the raised position shown in FIG. 2, the first actuator 111 is pushed against the stack of discs of the first coupling means 11 by a projection 114 of each flyweight.

The transmission device also has a second actuator constituted by a cup 62 that covers the coupling means 11 and 12 on the opposite side to the first actuator 111. The cup 62 is attached to the ring gear 6, which can slide parallel to the X-axis. The gear teeth 63 of the ring gear 6 are arranged axially and are sufficiently long that they mesh completely with the planet pinions 72 whatever the axial position of the ring gear 6. The second actuator 62 also has a ring 122 with teeth around its outer edge that are engaged in the splines 61. A compression spring 121 is interposed between the ring 122 and a face 69 that is attached to the ring gear 6. The spring 121 pushes the ring 122 back towards the discs and the first actuator 111. The teeth on the ring 122 are radially longer than the teeth on the discs attached to the ring gear 6. When the spring 121 is in idle state, it pushes the ring 122 until the extended teeth of the ring 122 rest against a shoulder 64 on the ring gear 6 under a predetermined prestress. The shoulder 64 forms a transition between a deeper area of the splines 61, in which the ring 122 is held axially, and a shallower area that can receive the teeth of the discs of the coupling means 12.

The transmission device also has a third control member 116 constituted by a sliding ring fitted on the radially inner side of the ribs 31, on the side axially opposite to the first actuator 111 relative to the stack of discs of the first friction coupling means 11. The third actuator 116 is prevented from leaving the ribs 31 by a stop bush 117 secured onto the ribs 31. From the limit position defined by the stop bush 117, the third control member 116 can slide on the ribs 31 to push the stack of discs of the first coupling means 11 towards the first actuator 111.

The transmission device also has a second control means 13, which has centrifugal flyweights 131 that are driven in rotation around the X-axis by the planet-carrier 7, and therefore at a speed proportional to the speed of rotation of the output element 4. The flyweights 131 have a projection 132 that rests against an end face 66 of the ring gear 6 through the intermediary of a thrust bearing 133 as the speed of rotation of the planet carrier 7, and therefore of the flyweights 131, around the X-axis is generally different from the speed of the ring gear 6.

When the flyweights 131 are idle (as shown in FIG. 1), the distance between the ring 122 resting against the shoulder 64 and the first control member 111 is such that the second friction coupling means 12 is in a disengaged state. When the flyweights 131 rise up under the action of the centrifugal force, as shown in FIGS. 3 and 4, which are described in detail below, the ring gear 6 and in particular the second actuator, comprising the cup 62, are pushed towards the first actuator 111 and therefore in the direction tending to compress the stack of discs of the second friction coupling means 12.

The teeth on the planetary gear train formed by the sun wheel 5, the ring gear 6 and the planet pinions 72 mounted in rotation on their planet carrier 7 are helical and the direction of inclination of the teeth is selected so that the axial reaction originating in the teeth 63 of the ring gear 6 when a propelling torque is transmitted, is in the direction tending to release the second friction coupling means 12 and push down the flyweights 131. This axial thrust is represented by the arrow $P_A$ in FIG. 2.

In the example shown in FIG. 1, the transmission device is also equipped with a reversing system 14 comprising a dog clutch 141 that is coupled in rotation around the X-axis with the planet carrier 7, but which can also slide axially relative to the planet carrier 7 by means of manual control means, not shown. To enable this sliding relative to the planet carrier 7, which is immobilised axially by bearings 73 on the stator shaft 21, the planet carrier and the dog clutch 141 are equipped with intermeshed splines 74, 142. On its radially outer face, the dog clutch 141 has teeth 143 which, in the forward position shown with solid lines in FIG. 1, mesh with corresponding teeth 41 on the output 4. In the reverse position shown partly with a dotted line, the teeth 143 mesh with a reverse idler gear 42, which in turn meshes with a second set of teeth 43 on the output 4. Furthermore, the dog clutch 141 has a stop area 144 which, when the dog clutch 141 is in reverse position, is placed around the flyweights 131, as shown with dotted lines in FIG. 1, preventing them from leaving their lowered idle position. As will be seen more clearly below, this prevents the transmission device from operating other than in neutral or in its first gear ratio when the dog clutch 141 is in reverse position.

The operation of the transmission device will now be described in more detail.

In the situation shown in FIG. 1, the rotational input element 3 is stationary, so that the flyweights 118 are lowered. The flyweights 131 of the second control means 13 are also lowered. The two friction coupling means 11 and 12 are in a disengaged state so that the rotational input element 3 can rotate freely relative to the output element 4, which corresponds to neutral. However, the vehicle is prevented from moving in reverse, for example along a sloping street, if the parking brake is insufficiently applied, as the planet carrier 7 could not rotate in the reverse direction without causing the sun wheel 5 and/or the ring gear 6 to rotate in the same direction; neither the sun wheel 5 nor the ring gear 6 can rotate as described as they are prevented from doing so by the free wheels 8 and 9 respectively. This is beneficial for hill starts, which are generally a difficult exercise for drivers of lower-category cars, who sometimes have limited driving expertise.

Similarly, if the dog clutch 141 is pushed into reverse position, the vehicle is, for similar reasons to those described above, prevented from moving forwards. This is beneficial for hill start operations in reverse.

From this situation, if the driver starts the engine, the rotational input element 3, coupled directly or indirectly (i.e. through the intermediary of a belt or a gearing system) but permanently to the vehicle's engine, starts to rotate and the flyweights of the first control means 113 rise as shown in FIG. 2; this tends to compress the discs of the first coupling means 11 against the third actuator 116 but without the radially outer part of the first actuator 111 pressing against the stack of discs of the second friction coupling means 12. When the rotational input element 3 rotates around the X-axis at a speed of rotation corresponding to the engine idling speed, the centrifugal force in the flyweights is so low that there is merely "drag" in the first friction coupling means 11, which may possibly cause a certain amount of rotation in the sun wheel 5. If the driver of the vehicle causes an increase in the speed of rotation of the engine, the centrifugal force in the flyweights on the first control means 113 gradually increases and the increasing engagement of the first friction coupling means 11 gradually brings the rotational input element 3 and the sun wheel 5 together in rotation. As the planet carrier 7 tends to be immobilised by the load to be driven, the rotation of the sun element 5 tends to cause a reverse rotation in the ring gear 6, but this is prevented by the second free wheel 9 so that the ring gear 6 is immobilised and the planet carrier 7 is driven in rotation in the same direction as the sun element 5 but at a much lower speed than the sun element 5.

At the same time, the speed of rotation of the output element 7 does not generate sufficient centrifugal force in the flyweights 131 to overcome the opposing action of the axial thrust $P_A$. This operation corresponds to the first gear ratio.

If the speed of rotation of the planet carrier 7 increases, the flyweights 131 eventually rise as shown in FIG. 3 and push the ring gear 6 in the direction of the compression of the second friction coupling means 12 against the first actuator 111. This force is less than the prestressing force of the springs 121 so that the ring 122 resting against the shoulder 64 moves as a single unit with the cup 62 attached to the ring gear 6.

At the start of this movement, the excess axial force produced by the flyweights 131 relative to the axial thrust $P_A$ is very low, just sufficient to produce drag in the friction coupling means 12. However, this drag decreases the force transmitted by the sun element 5 and therefore decreases the axial thrust $P_A$. Thus, the axial force in the direction of the engagement of the friction coupling means 12 gradually becomes greater and greater until, as shown in FIG. 3, the friction coupling means 12 is not only pushed up against the first actuator 111, but is eventually pushed into abutment against the disc of the rotational input element 3, whereby the first friction coupling means 11 is released. Consequently, the movement of the rotational input element 3 is no longer transmitted to the sun element 5, but to the ring gear 6. The sun element 5 then tends to rotate in reverse, but is prevented from doing so by its free wheel 8, so that the planet carrier 7 is driven at a new speed of rotation that is greater relative to the speed of the input element 3 than during operation in the first gear.

In fact, as is always the case when changing to a higher gear ratio in a vehicle, it is the speed of the input element 3 that decreases to match the new gear ratio, as the inertia of the load formed by the moving vehicle works against a significant change in the speed of rotation of the output (therefore of the planet carrier 7 in the example) during the gear changing process. This decrease in the speed of the rotational input element 3 during the gear changing process reduces the centrifugal force in the flyweights 118 and therefore favours the lowering of the flyweights 118 through the thrust exerted by the second actuator 62 via the second friction coupling means 12 on the first actuator 111.

If the speed of the output and consequently the speed of the planet carrier 7 continues to increase, the flyweights 131 eventually rise more than in the situation shown in FIG. 3, as shown in FIG. 4, whereby the cup 62 is pushed further to the left, due to the strength threshold of the spring 121 being exceeded and the spring 121 being then compressed. The ring 122 moves away from the shoulder 64 and a bearing face 67 on the cup 62 pushes the third actuator 116 towards the first actuator 111, with compression of the first friction coupling means 11. Once initiated, this movement can only intensify as it corresponds to a further drop in thrust $P_A$. In fact, some of the torque is then transmitted by the sun wheel 5, whereby the part transmitted by the teeth of the ring gear 6 is correspondingly reduced.

In this new situation, the two friction coupling means 11 and 12 are in an engaged state, and couple together the input element 3, the ring gear 6 and the sun element 5. This is a direct drive situation. The planet carrier 7 is also rotating at the common speed of rotation of the input element 3, the sun element 5 and the ring gear 6. The flyweights 118 on the first control means 113 remain in their lowered state.

During the various gear changing processes in the direction of reducing the speed of the input element 3 relative to the speed of the planet carrier 7, the gradual reduction, during each changing process, of the axial thrust, which tends to oppose this change, has the effect of stabilising the new gear ratio as soon as it has started to be established. Consequently, for the same engine torque, down-shifting can only take place at a lower speed of rotation of the planet carrier 7.

Down-shifting take place as follows:

from third to second gear, the change is initiated when slip starts to occur in the first friction coupling means 11 when the force generated by the flyweights 131 is only just sufficient to both overcome the thrust $P_A$ and compress the springs 121. This slip causes the sun element 5 to slow down until it is immobilised by its free wheel 8. This immobilisation increases the axial thrust $P_A$ and the flyweights 131 are thus pushed into their position as shown in FIG. 3, with the spring 121 relaxing to its minimum prestressed position.

from this situation, if the force of the flyweights 131 drops further and becomes insufficiently greater than the axial thrust $P_A$ to sufficiently compress the second friction coupling means 12 with regard to the engine torque to be transmitted between the input element 3 and the ring gear 6, the second friction coupling means 12 starts to slip, until it is immobilised by its free wheel 9. This tends to cause racing in the input element 3, and therefore an increase in the centrifugal force produced by the flyweights 118; the first friction coupling means 11 is thus returned to an engaged state to produce operation in first gear. The axial thrust $P_A$ increases and completely pushes down the flyweights 131, to end in the situation shown in FIG. 2.

The transmission device described above has the advantage, despite its great simplicity, of featuring the so-called "kick-down", which enables the driver to change into a lower gear simply by pressing the accelerator pedal, thanks to the resulting increase in the thrust $P_A$.

When the planet carrier 7 tends to rotate more quickly than the input element 3 (operation in engine braking mode), i.e. when the driver of the vehicle releases the accelerator pedal or when the vehicle is moving downhill, the torque applied to the input element 3 becomes negative, the axial thrust $P_A$ reverses and consequently assists the flyweights 131 to compress the second friction coupling means 12 and even, most of the time, the springs 121, and therefore also the first friction coupling means 11, to achieve direct drive operation.

For reasons of simplicity, FIGS. 2 to 4 do not show the reversing device 14 and instead show a simple output gearing 76, attached to the planet carrier 7.

The invention is not of course limited to the examples described and shown.

Other return springs can be envisaged, for example a spring tending to separate the first and third actuators 111, 116 from each other, or more generally to disengage the first friction coupling means 11.

Reverse could be obtained in a different way to that described, for example by immobilising the planet carrier 7 and activating a dog clutch that would release the ring gear 6 from the free wheel 9 and connect the ring gear 6 to the output shaft.

The arrangement described, with the two friction coupling means 11 and 12 arranged one around the other, is not limitative and they could, for example, be aligned axially.

The invention claimed is:

1. An automatic transmission device, comprising:
   a rotational input element and a rotational output element;
   a first and a second toothed element that each mesh with a third toothed element;
   a first coupling means to selectively couple a first one of the rotational input and output elements with the first toothed elements;
   a second coupling means for selective coupling said first one of the rotational input and output elements with said second toothed element;
   a third coupling means to couple a second one of the two rotational input and output elements with the third toothed element
   a first and second stopping means to selectively immobilize the first and second toothed elements respectively;
   a first actuator for the first coupling means; and characterized by
   a second actuator having a first position in which the first coupling means is either in an engaged state or a disengaged state, and the second coupling means is disengaged, and a second position in which the first coupling means is disengaged and the second coupling means is in an engaged state, wherein in the second position, the second actuator exerts thrust on the first actuator in the direction of the disengagement of the first coupling means.

2. An automatic transmission device according to claims 1, wherein a third actuator is fitted to selectively place the first coupling means in an engaged state by pushing the first coupling means against the first actuator.

3. An automatic transmission device according to claim 1, wherein there is provided for the second actuating means a second control means with centrifugal flyweights sensitive to the speed of rotation of the third toothed element and/or the output element.

4. An automatic transmission device according to claim 1, wherein at least one of the first and second stopping means is a free wheel.

5. An automatic transmission device according to claim 1, wherein the first toothed element is a sun wheel, the second toothed element is a ring gear and the third toothed element is a planet carrier on which the planet pinions mesh with the sun wheel and the ring gear.

6. An automatic transmission device according to claim 1, wherein reversing means are provided which, at least indirectly, selectively hold the second actuator in its first position.

7. An automatic transmission device according to claim 1, wherein said thrust is exerted by the intermediary of the second coupling means.

8. An automatic transmission device according to claim 7, wherein the first actuator is at the same time a counter bearing is at the same time a counterbearing for the second coupling means in an engaged state.

9. An automatic transmission device according to claim 1, wherein there is provided for the first actuator a first control means for the gradual setting in motion of the vehicle.

10. An automatic transmission device according to claim 9, wherein the first control means is of centrifugal type.

11. An automatic transmission device according to claim 10, wherein the first control means has centrifugal flyweights sensitive to the speed of the rotational input element and tending to put the first coupling means in an engaged state.

12. An automatic transmission device according to claim 1, wherein the second actuator is capable of a third position in which the first and second coupling means are in an engaged state.

13. An automatic transmission device according to claim 12, wherein in its third position, the second actuator acts on a third actuator, which pushes the first coupling means against the first actuator.

14. An automatic transmission device according to claim 12, wherein a prestressed spring is provided between the second actuator and the second coupling means.

15. An automatic transmission device according to claim 12, wherein a prestressed spring is fitted to define a strength threshold that the second actuator must exceed to move from its second to its third position.

16. An automatic transmission device according to claim 1, wherein means are provided to apply thrust produced by teeth to the second actuator from second to first position.

17. An automatic transmission device according to claim 16, wherein the second actuator is attached to the second toothed element.

18. An automatic transmission device comprising:
a rotational input element and a rotational output element;
a first and a second toothed element that each mesh with a third toothed element;
a first coupling means to selectively couple a first one of the rotational input and output elements with the first toothed element respectively;
a second coupling means for selectively coupling said first one of the rotational input and output elements with said second toothed elements;
a third coupling means to couple the second of the two rotational input and output elements with the third toothed element
first and second stopping means to selectively immobilize the first and second toothed elements respectively;
a first actuator for the first coupling means;
a second actuator having a first position in which the first coupling means is either in an engaged state or a disengaged state, and the second coupling means is disengaged, and a second position in which the first coupling means is disengaged and the second coupling means is in an engaged state, and
a third actuator is fitted to selectively place the first coupling means in an engaged state by pushing the first coupling means against the first actuator.

19. An automatic transmission device comprising:
a rotational input element and a rotational output element;
a first and a second toothed element that each mesh with a third toothed element;
a first coupling means to selectively couple a first one of the rotational input and output elements with the first toothed element respectively;
a second coupling means for selectively coupling said first one of the rotational input and output elements with said second toothed elements;
a third coupling means to couple the second of the two rotational input and output elements with the third toothed element
first and second stopping means to selectively immobilize the first and second toothed elements respectively;
a first actuator for the first coupling means; and characterized by
a second actuator having a first position in which the first coupling means is either in an engaged state or a disengaged state, and the second coupling means is disengaged, and a second position in which the first coupling means is disengaged and the second coupling means is in an engaged state, wherein there is provided for the second actuator a second control means with centrifugal flyweights sensitive to the speed of rotation of the third toothed element and/or the output element.

20. An automatic transmission device comprising:
a rotational input element and a rotational output element;
a first and a second toothed element that each mesh with a third toothed element;
a first coupling means to selectively couple a first one of the rotational input and output elements with the first toothed element respectively;
a second coupling means for selectively coupling said first one of the rotational input and output elements with said second toothed elements;
a third coupling means to couple the second of the two rotational input and output elements with the third toothed element
first and second stopping means to selectively immobilize the first and second toothed elements respectively;
a first actuator for the first coupling means; and characterized by
a second actuator having of a first position in which the first coupling means is either in an engaged state or a disengaged state, and the second coupling means is disengaged, and a second position in which the first coupling means is disengaged and the second coupling means is in an engaged state wherein means are provided to apply thrust produced by teeth to the second actuator in the direction of the movement of the second actuator from second to first position.

21. An automatic transmission device comprising:
a rotational input element and a rotational output element;
a first and a second toothed element that each mesh with a third toothed element;
a first coupling means to selectively couple a first one of the rotation input and output elements with the first toothed element respectively;
a second coupling means for selectively coupling said first one of the rotational input and output elements with said second toothed elements;
a third coupling means to couple the second of the two rotational input and output elements with the third toothed element
first and second stopping means to selectively immobilize the first and second toothed elements respectively;
a first actuator for the first coupling means; and characterized by
a second actuator having a first position in which the first coupling means is either in an engaged state or a disengaged state, and the second coupling means is disengaged, and a second position in which the first coupling means is disengaged and the second coupling means is in an engaged state, wherein there is provided for the first actuator a first control means for the gradual setting in motion of the vehicle.

22. An automatic transmission device according to claim 21, wherein the first control means has centrifugal fly-weights sensitive to the speed of the rotational input element and tending to put the first coupling means in an engaged state.

23. An automatic transmission device comprising:
   a rotational input element and a rotational output element;
   a first and a second toothed element that each mesh with a third toothed element;
   a first coupling means to selectively couple a first one of the rotational input and output elements with the first toothed element;
   a second coupling means for selectively coupling said first one of the rotational input and output elements with said second toothed elements;
   a third coupling means to couple the second of the two rotational input and output elements with the third toothed element
   first and second stopping means to selectively immobilize the first and second toothed elements respectively;
   a first actuator for the first coupling means; and characterized by
   a second actuator having of a first position in which the first coupling means is either in an engaged state or an disengaged state, and the second coupling means is disengaged, and a second position in which the first coupling means is disengaged and the second coupling means is in an engaged state, wherein the second actuator has a third position in which the first and second coupling means are in an engaged state.

24. A transmission device according to claim 23, wherein in its third position, the second actuator acts on a third actuator, which pushes the first coupling means against the first actuator.

25. A transmission device according to claim 23, wherein a prestressed spring is fitted to define a strength threshold that the second actuator must exceed to move from its second to its third position.

* * * * *